United States Patent
Oikawa et al.

(10) Patent No.: US 7,904,221 B2
(45) Date of Patent: Mar. 8, 2011

(54) VEHICLE CONTROL APPARATUS AND VEHICLE CONTROL METHOD

(75) Inventors: Yoshitaka Oikawa, Susono (JP); Hideki Takamatsu, Anjo (JP); Shoji Inagaki, Numazu (JP); Kenji Kawahara, Kariya (JP); Yasuhiro Nakai, Anjo (JP)

(73) Assignees: Toyota Jidosha Kabushiki Kaisha, Toyota-shi (JP); Denso Corporation, Kariya (JP)

( * ) Notice: Subject to any disclaimer, the term of this patent is extended or adjusted under 35 U.S.C. 154(b) by 1163 days.

(21) Appl. No.: 11/448,912

(22) Filed: Jun. 8, 2006

(65) Prior Publication Data
US 2007/0004553 A1   Jan. 4, 2007

(30) Foreign Application Priority Data
Jul. 4, 2005   (JP) ................... 2005-195128

(51) Int. Cl.
*B60G 17/018* (2006.01)
*B60G 23/00* (2006.01)
*B62C 3/00* (2006.01)
*B62K 25/00* (2006.01)
*G06F 17/00* (2006.01)
*G06F 19/00* (2006.01)

(52) U.S. Cl. ...... 701/37; 701/36; 267/140.11; 280/5.515; 280/124.1

(58) Field of Classification Search .......... 701/1, 36–38; 477/97; 267/2, 140.11; 280/5.515, 124.1
See application file for complete search history.

(56) References Cited

U.S. PATENT DOCUMENTS

| 6,005,315 A * | 12/1999 | Chapman ................. 310/90.5 |
| 6,098,593 A | 8/2000 | Aschner |
| 6,434,460 B1 * | 8/2002 | Uchino et al. .................. 701/37 |
| 6,671,596 B2 * | 12/2003 | Kawashima et al. ........... 701/37 |
| 2004/0094912 A1 * | 5/2004 | Niwa et al. ................. 280/5.518 |

FOREIGN PATENT DOCUMENTS

| DE | 197 22 253 A1 | 11/1998 |
| DE | 199 05 604 A1 | 8/2000 |
| JP | 2-189216 | 7/1990 |
| JP | 3-78542 | 4/1991 |
| JP | 2803309 | 7/1998 |
| JP | 10-211833 | 8/1998 |
| JP | 10-227231 | 8/1998 |
| JP | 2004-168148 | 6/2004 |

* cited by examiner

*Primary Examiner* — Jack Keith
*Assistant Examiner* — Rami Khatib
(74) *Attorney, Agent, or Firm* — Oblon, Spivak, McClelland, Maier & Neustadt, L.L.P.

(57) ABSTRACT

A vehicle has a drive control ECU that controls an internal combustion engine or a transmission on the basis of a target drive force. The drive control ECU has a first arbitrator that sets the target drive force on the basis of a driver's request and the like, and filters that have individually different damping characteristics and that correct the target drive force from the first arbitrator so that the vibration of a sprung weight of the vehicle is controlled, as well as a switch that includes a switching portion and a filter setting portion. The filter setting portion determines whether a pitching resonance frequency has changed. If having determined that the pitching resonance frequency has changed, the filter setting portion switches the filter having been used for correcting the target drive force to a filter corresponding to a post-change pitching resonance frequency.

11 Claims, 6 Drawing Sheets

VEHICLE CONTROL APPARATUS AND VEHICLE CONTROL METHOD

INCORPORATION BY REFERENCE

The disclosure of Japanese Patent Application No. 2005-195128 filed on Jul. 4, 2005, including the specification, drawings and abstract is incorporated herein by reference in its entirety.

BACKGROUND OF THE INVENTION

1. Field of the Invention

The invention relates to a vehicle control apparatus and a vehicle control method that set a predetermined target control amount that is used in running of a vehicle, and control at least the vehicle on the basis of the target control amount.

2. Description of the Related Art

As an apparatus of controlling vibrations of a vehicle, there is known a vehicle control apparatus which uses a physical quantity corresponding to at least one of the accelerator operation, the steering operation and the brake operation performed by a driver, as an input command, and control at least one of the engine and the brake corresponding to the input command (e.g., Japanese Patent Application Laid-Open Publication No. 2004-168148). In order to control vibrations of a vehicle, this vehicle control apparatus corrects the input command provided by the driver, by using a motion model concerning vibration that occurs due to an input command from a driver, that is, the up-down and/or torsional vibration caused by the road surface reaction force on the tires, the vibration of the vehicle body unsprung weight related to the suspension, and the vibration of the vehicle body sprung weight that the vehicle body itself receives.

The vehicle control apparatus, however, uses a single motion model in order to correct the input command provided by a driver. Therefore, in a vehicle capable of changes in its running characteristics in accordance with the taste of a driver or the like, it sometimes becomes impossible to obtain good vibration control of the vehicle despite using the aforementioned vehicle control apparatus. That is, if the damping characteristic of the vehicle is changed upon a driver's request as for example, there occur changes in specifications of the vehicle, such as the pitching resonance frequency and the like, leading to a failure of the vibration control. Besides the cases where vehicle characteristics are changed upon a driver's request, vehicle specifications can also change due to various other factors, such as changes in the running state of the vehicle and in the environments of vehicle run.

SUMMARY OF THE INVENTION

An object of the invention is to provide a vehicle control apparatus and a vehicle control method capable of performing good vibration control of a vehicle even if vehicle specifications change in accordance with a driver's request or the like.

A first aspect of the invention relates to a vehicle control apparatus that sets a target control amount that is used in running of a vehicle and controls the vehicle on the basis of at least the target control amount. This vehicle control apparatus includes at least one setting device for setting a target control amount that is used in running of a vehicle based on at least driver's request; specification determining device for determining whether a vehicle specification that changes in accordance with the at least driver's request has changed; first correcting device and second correcting device for correcting the target control amount set by the at least one setting device to control a vibration of a sprung weight of the vehicle, the first correcting device and the second correcting device having individually different damping characteristics; and switching device for, if it is determined that the vehicle specification has changed, switching control for the vibration from the first correcting device for correcting the set target control amount to the second correcting device corresponding to the changed vehicle specification.

This vehicle control apparatus includes the at least one setting device, the specification determining device, the first correcting device, the second correcting device and the switching device. The at least one setting device sets the target control amount on the basis of a driver's request via operating means, for example, an accelerator pedal, a brake pedal, a steering wheel, etc. The specification determining device determines whether a change has occurred in a vehicle specification that changes in accordance with a driver's request, for example, a pitching resonance frequency of the vehicle that changes in accordance with the running mode of the vehicle or the like set by the driver. Furthermore, the first correcting device and the second correcting device have individually different damping characteristics, and correct the target control amount so that the vibration of the sprung weight of the vehicle is controlled. In this vehicle control apparatus, if it is determined by the specification determining device that the vehicle specification has changed, the first correcting device having been used for correcting the target control amount is switched to the second correcting device corresponding to the changed vehicle specifications. Thus, by providing the first correcting device and the second correcting device that have individually different damping characteristics, and by switching from the first correcting device to the second correcting device in accordance with the vehicle specification, it becomes possible to perform good vibration control of the vehicle even if the vehicle specification changes in accordance with a driver's request or the like.

The switching device may set a waiting time that starts when the vehicle specification has changed, and that ends when the control for the vibration is switched from the first correcting device to the second correcting device.

Generally, there often is discontinuity between an output value of the first correcting device used for correcting the target control amount up to a certain time point and an output value of the second correcting device used after the switching by the switching device, due to a damping characteristic difference or the like. If as in this vehicle control apparatus, it is possible to set a waiting time starting when the vehicle specification has changed, and ending at the time of switch to the second correcting device, continuity between the output values of the first correcting device and the second correcting device can be substantially secured. Therefore, it becomes possible to substantially prevent or reduce incidents where the switching of correcting device increases the vibrations of the vehicle, or causes annoyance to an occupant.

Furthermore, the switching device may fix the waiting time in accordance with a difference between an output value of the first correcting device for correcting the target control amount and an output value of the second correcting device corresponding to the changed vehicle specification.

Therefore, it becomes possible to favorably secure continuity from the output value of the first correcting device to the output value of the second correcting device. Hence, it becomes possible to substantially prevent or reduce incidents where the switching increases the vibration of the vehicle, or causes annoyance to an occupant.

In this case, if it is determined that the vehicle specification has changed, the switching device may switch the control from the first correcting device for correcting the target control amount to the second correcting device corresponding to the changed vehicle specification when a difference between an output value of the first correcting device and an output value of the second correcting device converges at or below a predetermined value.

Furthermore, the switching device may switch the control from the first correcting device to the second correcting device when an absolute value of a difference between an output value of the first correcting device and an output value of the second correcting device converges at or below a first threshold value.

Furthermore, the following construction is also possible. That is, the switching device increments a count value when the absolute value of the difference between an output value of the first correcting device for correcting the target control amount and an output value of the second correcting device corresponding to the changed vehicle specification is less than or equal to the first threshold value. If the count value is greater than a second threshold value, the at least one setting device switches the control from the first correcting device to the second correcting device.

Still further, in this case, the switching device may change the first threshold value and the second threshold value in accordance with at least a driver's request.

The vehicle control apparatus of the first aspect of the invention may further include emergency determination device for determining a degree of emergency based on at least a running state of the vehicle, and third correcting device for correcting the target control amount based on the degree of emergency.

Therefore, by providing the third emergency device used exclusively in cases where the degree of emergency that can be assessed at least from the running state of the vehicle is high, for example, a case of emergency stop or a case where the behavior of the vehicle has become unstable, it becomes possible to execute vibration control correction with the target control amount being appropriate for the case of high degree of emergency. The third correction device may have a damping characteristic thereof that is determined through experiments and analyses on assumption of a case where the degree of emergency is high. Furthermore, the third correction device may also be a device that does not execute substantial correction of the damping ratio=1.

Furthermore, the switching device may promptly switch control for the vibration from the first correcting device for correcting the target control amount to the third correcting device based on the degree of emergency.

The emergency determining device determines that the degree of emergency is high, if at least one of following conditions is met:
(1) a condition that an emergency brake request has been made;
(2) a condition that a behavior stabilization request has been made;
(3) a condition that a brake assist request or a crash prevention request has been made;
(4) a condition that a possibility of occurrence of an emergency, including a crash, has been detected; and
(5) a condition that a fail signal has been generated.

In this case, if the behavior stabilization request and the crash prevention request are simultaneously output, the at least one setting device may give priority to the crash prevention request, and the switching device may switch control for the vibration to the third correcting device corresponding to the crash prevention request.

Therefore, by promptly switching to the third correcting device if the degree of emergency is high, it becomes possible to favorably secure safety during running of the vehicle.

The target control amount may be a target drive force of the vehicle, and the first correcting device, the second correcting device and the third correcting device may be two-dimensional notch filters, and the first correcting device, the second correcting device and the third correcting device may have individually different parameters for determining damping characteristics of each other.

Generally, the transfer function where the input is the target drive force of the vehicle and the output is the rear suspension stroke (e.g., the stroke of a rear suspension) of the vehicle can be expressed as a quadratic/quartic transfer function. This quadratic/quartic transfer function includes two quadratic transfer functions. One of them does not come to induce oscillation whereas the other comes to induce oscillation. Hence, it becomes possible to perform vibration control of the vehicle by correcting the target drive force as a target control amount through the use of one of two-dimensional notch filters which cancels the pole of the oscillation-inducing quadratic transfer function which is included in the quadratic/quartic transfer function. By providing the first correcting device, the second correcting device and the third correcting device that are different from one another in the parameters for determining their damping characteristics, and by switching control for the vibration from the first correcting device to the second correcting device or to the third correcting device in accordance with vehicle specifications that change, it becomes possible to perform good vibration control of the vehicle even if the vehicle specifications change in accordance with driver's requests and the like.

A second aspect of the invention relates to a vehicle control apparatus that sets a predetermined target control amount that is used in running of a vehicle and controls the vehicle based on the target control amount. The vehicle control apparatus includes at least one setting device for setting a target control amount based on at least a driver's request; specification determining device for determining whether a vehicle specification that changes in accordance with the at least a driver's request has changed; first correcting device for correcting the target control amount set by the at least one setting device to control a vibration of a sprung weight of the vehicle, if it is determined that the vehicle specification has not changed, the first correcting device having a damping characteristic; and second correcting device for correcting the target control amount to control the vibration, if it is determined that the vehicle specification has changed, the second correcting device having a damping characteristic different from the damping characteristic of the first correcting device.

A third aspect of the invention is a vehicle control method in which a predetermined target control amount that is used in running of a vehicle is set, and the target control amount is corrected by one of a plurality of correcting device having individually different damping characteristics. The method includes:
(a) the step of setting the target control amount based on at least a driver's request;
(b) the step of determining whether a vehicle specification that changes in accordance with the at least driver's request has changed; and
(c) the step of, if it is determined that the vehicle specification has changed, switching control for a vibration of a sprung weight of the vehicle from correcting device for correcting the target control amount to correcting device that has a damping characteristic different from a damping characteristic of the aforementioned correcting device.

In the second and third aspect of the invention, it becomes possible to perform good vibration control of the vehicle even if the vehicle specifications change in accordance with driver's requests and the like.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Best modes for carrying out the invention will be described in detail hereinafter with reference to the drawings.

Figure 1:
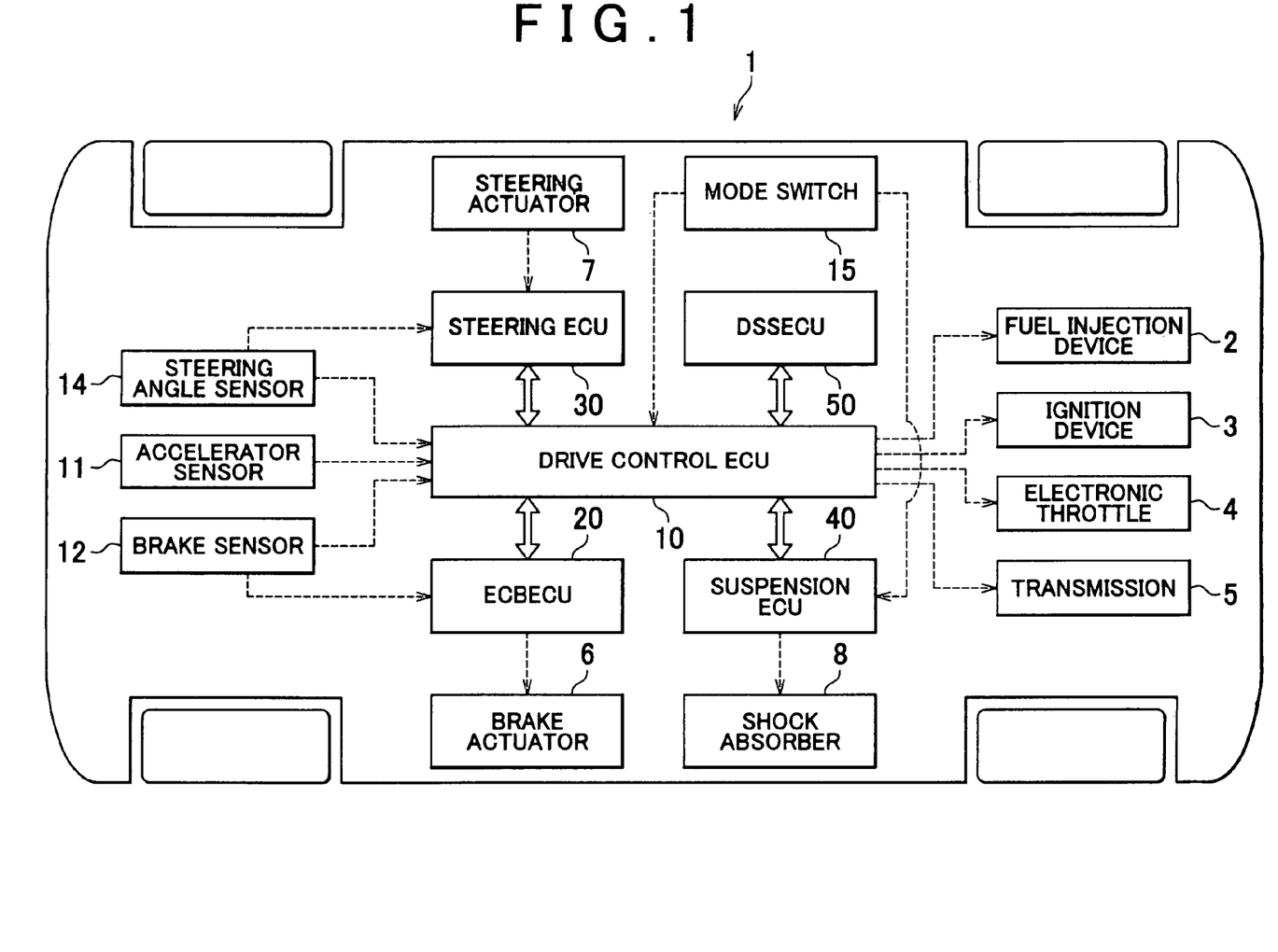
FIG. 1 is a block diagram showing a construction of a vehicle to which a vehicle control apparatus in accordance with an embodiment of the invention is applied.

FIG. 1 is a block diagram showing a construction of a vehicle to which a vehicle control apparatus in accordance with an embodiment of the invention is applied. A vehicle 1 shown in FIG. 1 has an internal combustion engine (not shown) such as a gasoline engine, a diesel engine, etc., as a drive source. This internal combustion engine includes a fuel injection device 2, an ignition device 3, an electronically controlled throttle valve 4 (hereinafter, simply referred to as "throttle valve 4"), etc. The vehicle 1 is also provided with a transmission 5 that transfers the power generated by the internal combustion engine, such as an automatic transmission, a stepless transmission, etc. Furthermore, the vehicle 1 is provided with an electronically controlled brake system that includes a brake actuator 6 electronically controlled in accordance with the amount of operation of a brake pedal or the like, a steering device that includes a variable gear mechanism, and a steering actuator 7, such as an electrical assist unit, etc., which are electronically controlled in accordance with the amount of operation of a steering wheel, as well as an electronically controlled suspension that includes a plurality of shock absorbers 8 electronically controlled to change their damping force, etc.

The internal combustion engine and the transmission 5 of the vehicle 1 are controlled by a drive control-purpose electronic control unit (hereinafter, referred to as "drive control ECU", with each electronic control unit being referred to as "ECU") 10. The drive control ECU 10 in this embodiment is constructed as, for example, a multiprocessor unit, and includes a plurality of CPUs that execute various computational processes, a ROM that stores various control programs, a RAM used as a work area for storing data and executing programs, an input/output interface, storage devices, and the like (none of which is shown in the drawings). An accelerator sensor 11, a brake sensor 12 and a steering angle sensor 14 are connected to the drive control ECU 10.

The accelerator sensor 11 detects the amount of operation of an accelerator pedal performed by a driver, and gives a signal indicating the detected value to the drive control ECU 10. The brake sensor 12 detects the amount of operation of a brake pedal performed by a driver, and gives a signal indicating the detected value to the drive control ECU 10. The steering angle sensor 14 detects the steering angle, that is, the amount of operation of the steering wheel performed by a driver, and gives a signal indicating the detected value to the drive control ECU 10. In accordance with the driver's requests indicated by the signals from the sensors 11, 12, 14 and the detected values from other sensors (not shown), the drive control ECU 10 controls the fuel injection device 2, the ignition device 3, the throttle valve 4 and the transmission 5 so as to meet the driver's requests.

In addition, a mode switch 15, as a running characteristic (running mode) determining unit is connected to the drive control ECU 10. The mode switch 15 is used to switch the damping force of the shock absorbers 8 included in the electronically controlled suspension system. By operating the mode switch 15, the running characteristic of the vehicle 1, that is, the running mode thereof, can be changed. In this embodiment, when the mode switch 15 is turned off by the driver, the damping force of each shock absorber 8 is set to a standard value, whereby the running characteristic of the vehicle 1 is set to a normal mode. Furthermore, if the mode switch 15 is operated and the "mode 1" is set, the damping force of each shock absorber 8 is set to a relatively hard side from a standard setting, whereby the running characteristic of the vehicle 1 is set to a power mode. During the power mode, the accelerating performance is given priority over the vibration control of the vehicle 1. If the mode switch 15 is operated and the "mode 2" is set, the damping force of each shock absorber 8 is set to a relatively soft side from the standard setting, whereby the running characteristic of the vehicle 1 is set to a comfort mode. During the comfort mode, the vibration control is given priority over the accelerating performance of the vehicle 1.

The drive control ECU 10 is connected to an ECBECU 20, a steering ECU 30, a suspension ECU 40, and a DSSECU 50 via an in-vehicle LAN or via wireless communication. The ECBECU 20 controls the aforementioned electronically controlled brake system and, specifically, controls the brake actuator 6 and the like on the basis of the detected values from the various sensors that include the brake sensor 12. The ECBECU 20 in this embodiment is constructed so as to be able to execute an integrated control of the driving, the steering and the braking of the vehicle 1 (VDIM: Vehicle Dynamics Integrated Management) so that the behavior of the vehicle 1 stabilizes, in cooperation with the drive control ECU 10, the steering ECU 30 and the suspension ECU 40.

The steering ECU 30 controls the steering device of the vehicle 1 and, specifically, controls the steering-purpose actuator 7 and the like on the basis of the detected values from various sensors that include the steering angle sensor 14. The suspension ECU 40 controls the aforementioned electronically controlled suspension and, specifically, controls the switching of the damping force of each shock absorber 8 in accordance with the operation of the mode switch 15 performed by the driver. The DSSECU 50 centrally controls the drive assist and substitution for a driver, and functions as a cruise controller, a brake assist unit, and a crash prevention system (pre-crash safety system). It is apparent that the drive control ECU 10, the ECBECU 20, the steering ECU 30, the suspension ECU 40 and the DSSECU 50 receive information necessary for control from various sensors and the like, for example, a throttle opening degree sensor, a vehicle speed sensor, a longitudinal acceleration sensor, a yaw rate sensor, and a radar unit as well as units (environment information acquisition unit) for acquiring information regarding the environment of run of the vehicle 1 which include, for example, a monitor system for detecting the vehicle-to-vehicle distance, a navigation system, a road traffic information communication system (VICS), a image-capturing unit or an vehicle-to-vehicle distance sensor for acquiring the vehicle-to-vehicle distance, etc.

Figure 2:
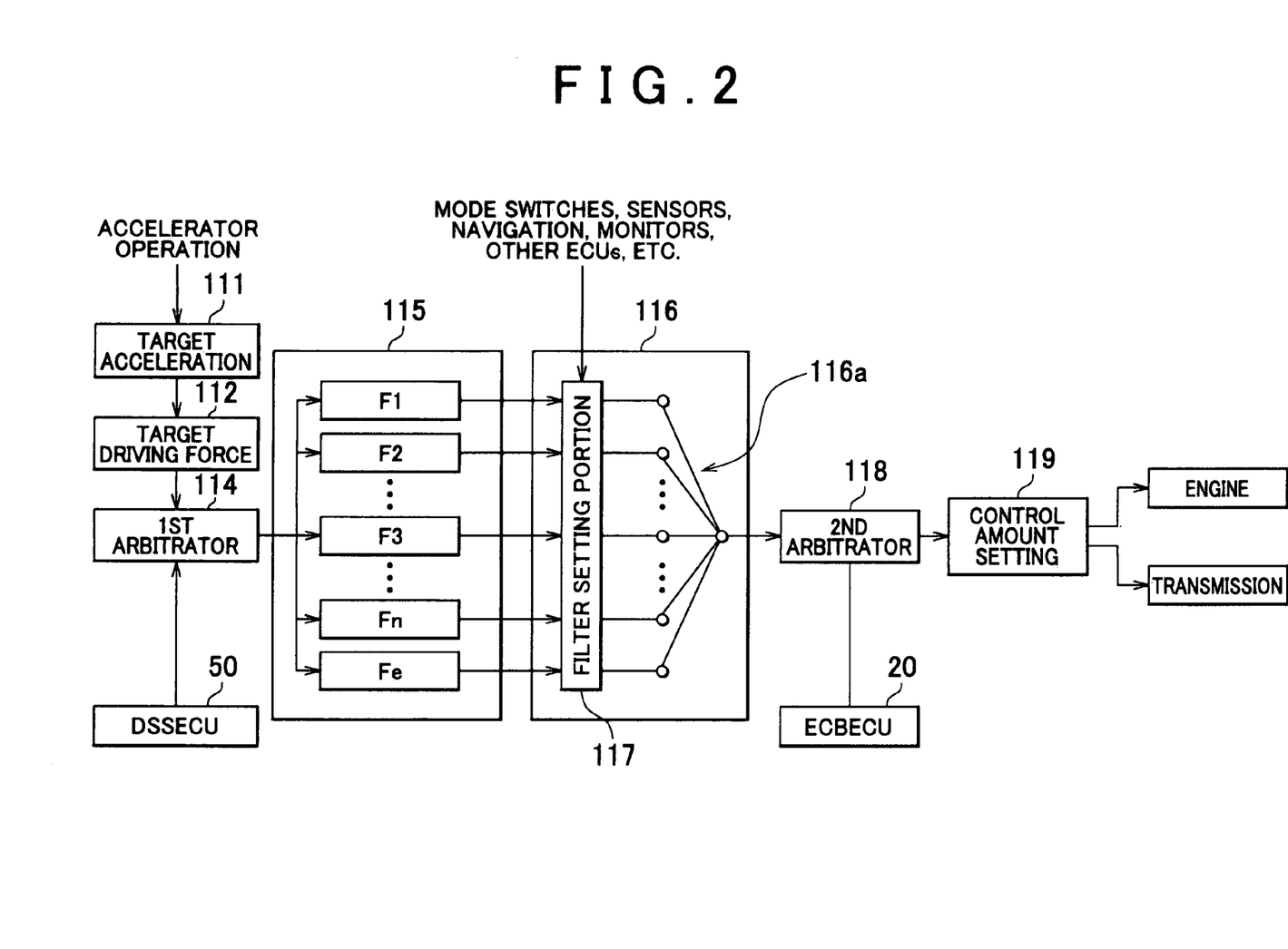
FIG. 2 is a block diagram illustrating a procedure of control of an internal combustion engine and a transmission executed by the drive control apparatus in accordance with the embodiment of the invention.

FIG. 2 is a block diagram illustrating the procedure of control of the internal combustion engine, as a driving apparatus, and the transmission executed by the drive control ECU 10. The controls related to this diagram are basically executed by the drive control ECU 10 (or any of the processors contained therein). That is, the drive control ECU 10, as shown in FIG. 2, includes a target acceleration acquiring unit 111, a target drive force acquiring unit 112, a first arbitrator 114, a filter group 115, a switcher 116, a second arbitrator 118, and a control amount setting portion 119.

The target acceleration acquiring unit 111 acquires a target acceleration of the vehicle 1 corresponding to the amount of accelerator operation indicated by the signal from the accelerator sensor 11 through the use of a map that provides a relationship between the amount of accelerator operation performed by the driver and the target acceleration of the vehicle 1, or the like, and then gives a signal indicating the acquired value to the target drive force acquiring unit 112. The target drive force acquiring unit 112 acquires a target drive force of the internal combustion engine corresponding to the target acceleration acquired by the target acceleration acquiring unit 111, that is, the amount of accelerator operation, through the use of a map that provides a relationship between the target acceleration of the vehicle 1 and the target drive force of the internal combustion engine, or the like. Then, the target drive force acquiring unit 112 gives a signal indicating the acquired value to the first arbitrator 114.

The first arbitrator 114 sets a target drive force Pt of the internal combustion engine on the basis of at least either one of the signal from the target drive force acquiring unit 112 and a request from the DSSECU 50 that is another control apparatus included in the vehicle 1. Specifically, the DSSECU 50 in this embodiment functions also as a so-called cruise controller that assists or substitutes for the driving of the vehicle 1 performed by a driver. If a driver requests execution of the cruise control, the DSSECU 50 makes a request to the first arbitrator 114 for a drive force needed for the cruise control. In that case, the first arbitrator 114 basically sets a target drive force Pt of the internal combustion engine by adding the requested drive force from the DSSECU 50 serving as a cruise controller to the target drive force from the target drive force acquiring unit 112. Furthermore, the DSSECU 50 in this embodiment functions also as a brake assist unit or a crash prevention system as mentioned above. If the DSSECU 50 makes a brake assist request or a crash prevention request, the first arbitrator 114 basically gives priority to the request from the DSSECU 50 over the target drive force from the target drive force acquiring unit 112, and sets the requested drive force from the DSSECU 50 as a target drive force Pt of the internal combustion engine.

The filter group 115 includes a plurality of filters (F1, F2, F3 . . . Fn, wherein is a positive integer of 1 or greater, and for example, an integer greater than the number of the running modes of the vehicle 1) which are each capable of correcting the final target drive force Pt set by the first arbitrator 114 so that the vibration of the unsprung weight of the vehicle 1 will be controlled, and one emergency-use filter Fe. In this embodiment, the filters F1 to Fn constituting the filter group 115 are two-dimensional notch filters having damping characteristics different from one another. The signal from the first arbitrator 114 is given to the filters F1 to Fn of the filter group 115, and the filters F1 to Fn each execute a vibration control correcting process with respect to the target drive force Pt.

Similarly, the emergency-use filter Fe in the filter group 115 is also constructed as a two-dimensional notch filter, and executes a vibration control correcting process with respect to the target drive force Pt from the first arbitrator 114. The emergency-use filter Fe is used exclusively in cases where the degree of emergency that can be assessed at least from the running state of the vehicle is high, for example, a case of emergency stop or a case where the behavior of the vehicle has become unstable. The damping characteristic thereof is determined, for example, through experiments and analyses on assumption of a case where the degree of emergency is high. Incidentally, the emergency-use filter Fe does not need to be a two-dimensional notch filter, but may also be a filter that does not execute substantial correction of the damping ratio=1.

The switcher 116 is connected to the individual filters F1 to Fn and Fe of the filter group 115. As shown in FIG. 2, the switcher 116 includes a switching portion 116a, and a filter setting portion 117 that switches filters for correction of the target drive force Pt by controlling the switching portion 116a. As can be understood from FIG. 2, the filter setting portion 117 is connected with the mode switch 15 for setting the running mode (running characteristic) of the vehicle 1, sensors and the like, such as the steering angle sensor 14 for detecting the running state of the vehicle and the like, and the environment information acquisition units for acquiring information regarding the environment of run of the vehicle 1, such as the navigation system and the like. The filter setting portion 117 selects an optimal filter from the filters F1 to Fn of the filter group 115 on the basis of the running mode or the running state of the vehicle 1 and the environment of run obtained from the mode switch 15 and the like, and gives a command signal to the switching portion 116a so that the output from the selected filter, that is, the post-correction target drive force Ptc, is given to the second arbitrator 118 via the switching portion 116a.

The filter setting portion 117 determines the level, that is, high or low level, of the degree of emergency related to the safety of the vehicle 1 on the basis of the information that includes at least the running state of the vehicle indicated by the signal from the radar unit or the monitor system or the signal from the ECBECU 20 or the DSSECU 50. If the filter setting portion 117 has determined that the degree of emergency is high, the filter setting portion 117 selects the emergency-use filter Fe as a correction device used for correction of a target control amount, and gives a command signal to the switching portion 116a so that the output from the emergency-use filter Fe, that is, the post-correction target drive force Ptc, is given to the second 20' arbitrator 118 via the switching portion 116a.

The second arbitrator 118 sets a target drive force Ptc on the basis of at least one of the post-correction target drive force Ptc from the switcher 116 and the request from the ECBECU 20 that is another control apparatus included in the vehicle 1. That is, the ECBECU 20 in this embodiment also executes a control for stabilizing the behavior of the vehicle 1. If the behavior of the vehicle 1 becomes unstable, the ECBECU 20 makes a request to the second arbitrator 118 for a drive force needed to stabilize the behavior of the vehicle 1. In that case, the second arbitrator 118 sets as an output value thereof the larger one or the smaller one of the target drive force Ptc from the switcher 116 and the requested drive force from the ECBECU 20 in accordance with the behavior of the vehicle 1 (so-called minimum selection or maximum selection). Incidentally, if the DSSECU 50 makes a crash prevention request and the ECBECU 20 makes a behavior stabilization request, the second arbitrator 118 may give priority to the crash prevention request from the DSSECU 50.

The control amount setting portion 119 determines control amounts of the fuel injection device 2, the ignition device 3, the throttle valve 4 and the transmission 5 on the basis of the output value of the second arbitrator 118. On the basis of the control amounts determined by the control amount setting portion 119, the drive control ECU 10 generates control signals for the fuel injection device 2, the ignition device 3, the throttle valve 4 and the transmission 5, and give them to these devices and the like. Therefore, the internal combustion engine and the transmission 5 of the vehicle 1 are controlled so as to meet the request from the driver or the ECBECU 20 and the DSSECU 50.

The reason why the filter group 115 that includes the filters F1 to Fn and Fe formed by two-dimensional notch filters as described above is provided for the drive control ECU 10 in this embodiment is as follows. For example, if the vehicle 1 is a rear wheel drive vehicle, the transfer function where the input is the target drive force of the vehicle and the output is the rear suspension stroke of the vehicle can generally be expressed as a quadratic/quartic transfer function presented in the expression (1).

$$Px_r(s) = K \cdot \frac{\omega_{n1}^2 \cdot \omega_{n2}^2}{z_1 \cdot z_2} \cdot \frac{s - z_1}{s^2 + 2\xi_1 \cdot \omega_{n1} \cdot s + \omega_{n1}^2} \cdot \frac{s - z_2}{s^2 + 2\xi_2 \cdot \omega_{n2} \cdot s + \omega_{n2}^2} \quad (1)$$
$$= K \cdot G_1(s) \cdot G_2(s)$$

This quadratic/quartic transfer function (1) includes two quadratic transfer function $G_1(s)$ and $G_2(s)$. Identification of the expression (1) shows that the value of the damping ratio $\xi_1$ in the quadratic transfer function $G_1(s)$ is oscillatory and the damping ratio $\xi_2$ in the quadratic transfer function $G_2(s)$ is non-oscillatory. Therefore, the quadratic transfer function $G_2(s)$ in the expression (1) does not induce oscillation whereas the quadratic transfer function $G_1(s)$ induces oscillation. Hence, it becomes possible to perform vibration control of the vehicle 1 by correcting the target drive force Pt as the target control amount through the use of one of the filters F1 to Fn and Fe formed as two-dimensional notch filters which cancels the pole of the oscillation-inducing quadratic transfer function $G_1(s)$ which is included in the quadratic/quartic transfer function of the expression (1).

The two-dimensional notch filter that cancels the pole of the quadratic transfer function $G_1(s)$ of the expression (1) assumes the form of a quadratic/quadratic transfer function, and can be expressed as in the following expression (2), where $\omega_m$ is the model frequency; $\xi_m$ is the model damping ratio; $\omega_p$ is the plant frequency of the drive system of the vehicle 1 that is a plant herein; and $\xi_p$ is the plant damping ratio. Therefore, the drive control ECU 10 is provided with the filters F1 to Fn and Fe that are constructed so that the target drive force Pt is corrected through the use of the correction equation of the expression (2).

$$C(s) = \frac{s^2 + 2\xi_p \cdot \omega_p \cdot s + \omega_p^2}{s^2 + 2\xi_m \cdot \omega_m \cdot s + \omega_m^2} \quad (2)$$

In this case, the parameters in the expression (2), such as the model frequency $\omega_m$, the model damping ratio $\xi_m$, the plant frequency $\omega_p$, and the plant damping ratio $\xi_p$, assume different values in accordance with changes in the specifications of the vehicle 1, for example, a pitching resonance frequency. In turn, the specifications of the vehicle 1 assume different values in accordance with changes in the running characteristic, that is, the running mode, of the vehicle 1 determined corresponding to the driver's request (selection), and changes in factors (disturbances), for example, the environment of run and the running state of the vehicle 1. Therefore, in order to cope with changes in the vehicle specifications, the filters F1 to Fn of the filter group 115 of the vehicle 1 in this embodiment are different from one another in the values of the model $\omega_m$, the model damping ratio $\xi_m$, the plant frequency $\omega_p$ and the plant damping ratio $\xi_p$, that is, the damping characteristics of the filters F1 to Fn are determined so as to be different from one another.

The filter setting portion 117 included in the switcher 116 acquires a vehicle specification, for example, a pitching resonance frequency or the like, corresponding to the running mode set by the driver and the running state or the environment of run of the vehicle obtained from the various sensors, the navigation system, etc., through the use of a predetermined map or the like, and determines whether the vehicle specification has changed. If it is determined that the vehicle specification has changed, the filter setting portion 117 selects a filter corresponding to the current vehicle specification from the filters F1 to Fn and Fe of the filter group 115 in accordance with a predetermined condition. Then, the filter setting portion 117 gives a command signal to the switching portion 116a so that the selected filter is connected to the control amount setting portion 119. Thus, the post-correction target drive force Ptc output from the filter F1 to Fn or Fe selected corresponding to the vehicle specification is given to the control amount setting portion 119.

By providing a plurality of filters F1 to Fn and Fe that are different in the parameters for determining their damping characteristics, and by switching filters F1 to Fn and Fe in accordance with vehicle specifications, such as the pitching resonance frequency, which change during running of the vehicle, it becomes possible to always perform good vibration control of the vehicle 1 despite changes in the vehicle specifications depending on driver's requests, various external factors, etc. Furthermore, if a plurality of filters F1 to Fn and Fe having individually different damping characteristics are switched from one to another in accordance with vehicle specifications as in this embodiment, it becomes possible to secure good responsiveness to changes in the vehicle specifications, in comparison with, for example, the case where a parameter of one filter is changed in accordance with changes in the running mode or the like.

Incidentally, in the case where a plurality of filters F1 to Fn are used by switching from one to another in accordance with changing vehicle specifications as mentioned above, there often is a discontinuity between the output value of a filter used to correct the target drive force Pt up to a certain time point and the output value of the filter used after the switching by the switcher 116, due to a damping characteristic difference or the like. If a switch between filters whose output values are discontinuous is performed, there is a risk that the switch between the filters F1 to Fn may increase the vibrations of the vehicle 1 or may cause annoyance to an occupant.

Figure 3:
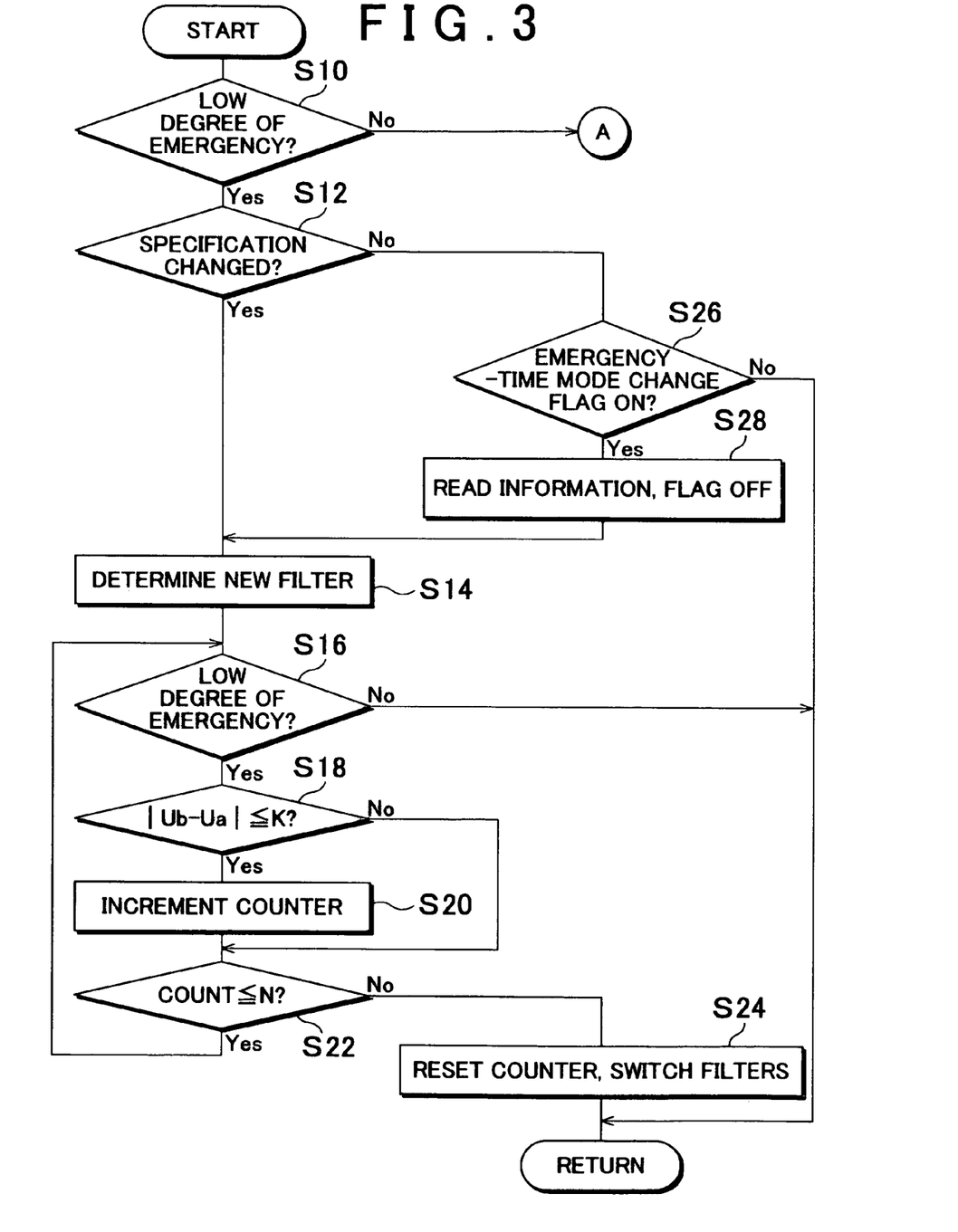
FIG. 3 is a flowchart illustrating a procedure of switching filters used for correction of a target drive force in the vehicle shown in FIG. 1.

Therefore, in order to suppress vibrations so as to maintain good riding comfort of the vehicle 1, the switching of filters F1 to Fn is executed in accordance with a procedure shown in FIG. 3. The routine shown in FIG. 3 is repeatedly executed by the drive control ECU 10 at intervals of a predetermined time during running of the vehicle 1. When the execution timing of this routine is reached, it is first determined by the filter setting portion 117 of the switcher 116 whether the aforementioned degree of emergency is high or low (S10). In this embodiment, it is determined that the degree of emergency is high, for example, in the following cases.
(1) The case where an emergency brake request has been output from the ECBECU 20.
(2) The case where a behavior stabilization request has been output from the ECBECU 20.
(3) The case where a brake assist request or a crash prevention request has been output from the DSSECU 50.
(4) The case where a possibility of occurrence of an emergency, such as a crash or the like, has been detected by a monitoring system, such as a radar unit, a monitor system, etc.
(5) The case where a fail signal has been generated by a fail monitoring system related to a control (including the case of occurrence of a computational abnormality or an abnormality of a control module).

If the filter setting portion 117 determines that one of the cases (1) to (5) does not apply to the present situation and the degree of emergency is low (YES at S10), the filter setting portion 117 acquires a pitching resonance frequency occurring at that time point as a vehicle specification through the use of a predetermined map or the like, and on the basis of the running mode and the running state of the vehicle 1 obtained from the mode switch 15 and the like as well as the environment of run. Then, the filter setting portion 117 determines whether the pitching resonance frequency has changed from the previous value (a predetermined initial value if it is only a short time after the startup of the vehicle) due to a driver's request, an external factor or the like (S12). If it is determined that the pitching resonance frequency as a vehicle specification has changed from the previous value (YES at S12), the filter setting portion 117 selects and determines a filter corresponding to the pitching resonance frequency occurring at that time point from the filters F1 to Fn of the filter group 115, in accordance with the predetermined condition (S14). Subsequently, the filter setting portion 117 determines again whether the degree of emergency is low (S16). If it is determined at S16 that the degree of emergency is high (NO at S16), the determination process of S10 is executed again as shown in FIG. 3.

Conversely, if it is determined at S16 that the degree of emergency is low (YES at S16), the filter setting portion 117 finds the absolute value of a deviation between the output value Ub of the filter used for correction of the target drive force Pt (connected to the second arbitrator 118 via the switching portion 116a) up to that time point (hereinafter, referred to as "filter Fb") and the output value Ua of the new filter determined at S14 (hereinafter, referred to as "filter Fa"), and determines whether the absolute value of the deviation is less than or equal to a predetermined threshold value K (S18). If it is determined that the absolute value of the deviation is less than or equal to the threshold value K (YES at S18), the filter setting portion 117 increments a predetermined counter (not shown) by "1" (S20), and determines whether the count value of the counter is less than or equal to a predetermined threshold value N (S22). Conversely, if it is determined that the absolute value of the deviation is above the threshold value K (NO at S18), the filter setting portion 117 executes the determination process of S22 without incrementing the counter.

If it is determined that the count value of the counter is less than or equal to the threshold value N (YES at S22), the process starting at S16 is repeated. If it is determined that the count value of the counter becomes greater than the threshold value N (NO at S22) while the process from S16 to S22 is repeatedly executed, the filter setting portion 117 resets the counter, and gives a command signal to the switching portion 116a so that the output from the new filter Fa determined at S14, that is, the post-correction target drive force Ptc, is given to the second arbitrator 118 via the switching portion 116a (S24). Thus, the filter for the vibration control correction of target drive force Pt output from the first arbitrator 114 is switched from the filter Fb to the new filter Fa.

Figure 4:
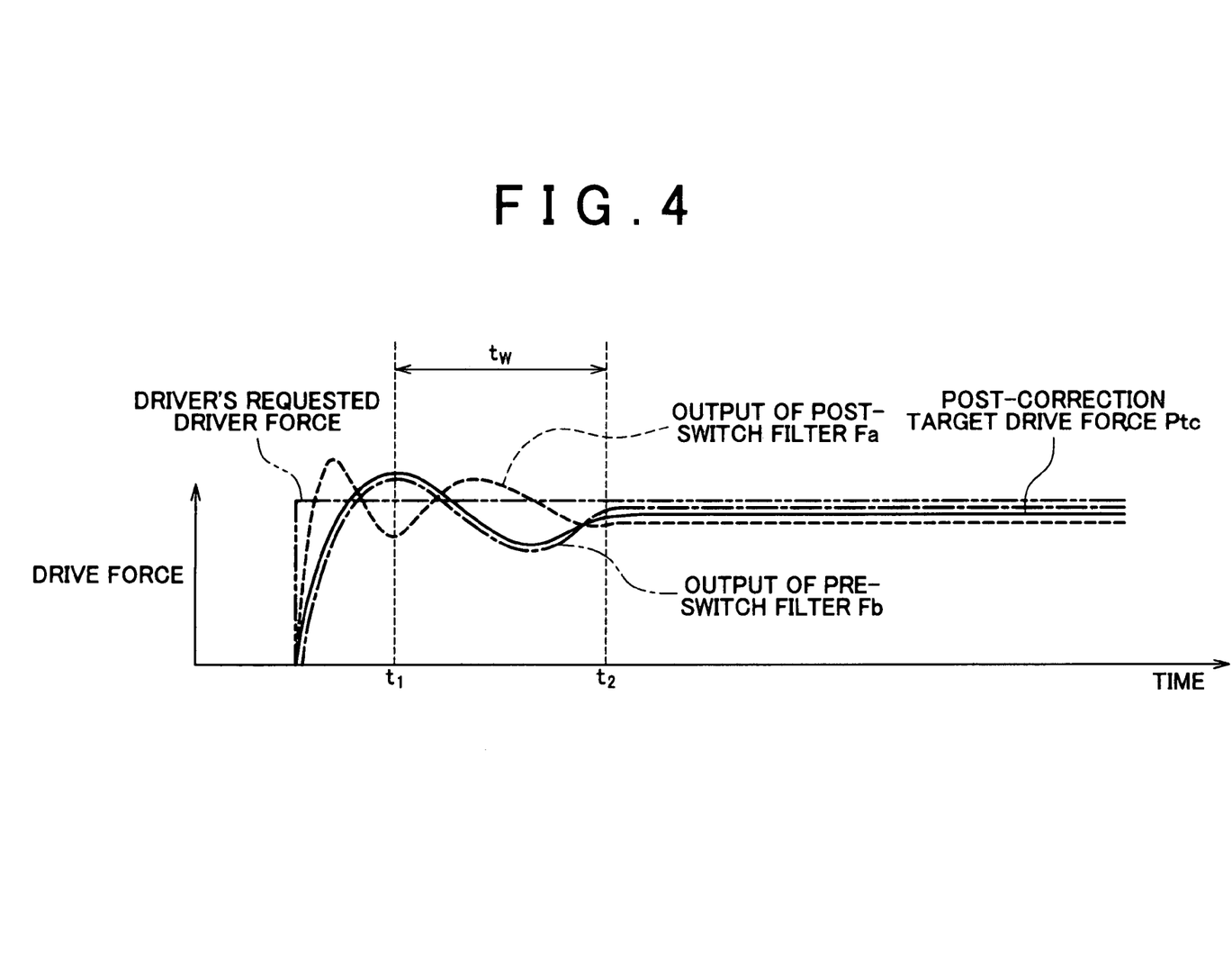
FIG. 4 is a time chart illustrating the states of corrected target drive force before and after filter switching.

As described above, if in the vehicle 1, the pitching resonance frequency as a vehicle specification changes due to a driver's request, an external factor or the like, a filter Fa corresponding to the post-change pitching resonance frequency is determined from the filters F1 to Fn constituting the filter group 115. Then, after the process from S16 to S22 is repeatedly executed a certain number of times, the filter Fb is switched to the new filter Fa. That is, in the vehicle 1, if it is determined that the pitching resonance frequency as a vehicle specification has changed at time point t1 as indicated in FIG. 4, the process from S16 to S22 is repeatedly executed before actual execution of the filter switching; that is, the filter switching is executed at time point t2 that is some time after time point t1

That is, in this embodiment, after the filter setting portion 117 of the switcher 116 determines that the pitching resonance frequency has changed, a waiting time tw preceding the execution of filter switching is set in the switching portion 116a such that the filter switching is executed when the absolute value of the deviation between the output value Ub of the filter Fb having been used for correction of the target drive force Pt up to that time and the output value Ua of the filter Fa corresponding to the post-change pitching resonance frequency has stabilized at or below the predetermined value K. Since the output value Ub of the pre-switch filter Fb and the output value Ua of the post-switch filter Fa converge approximately to the driver's requested drive force as time elapses, the wait time tw makes it possible to favorably secure continuity between the output value of the pre-switch filter Fb and the output value of the post-switch filter Fa as indicated in FIG. 4. Therefore, in the vehicle 1, it becomes possible to substantially prevent or reduce incidents where the filter switching increases the vibrations of the vehicle 1, or causes annoyance to an occupant.

If it is determined at S10 in the routine of FIG. 3 that one of the conditions (1) to (5) applies to the present situation and therefore the degree of emergency is high (NO at S10), the filter setting portion 117 selects an emergency-use filter Fe as a filter that is used for correction of the target drive force Pt, and gives a command signal to the switching portion 116a so that the emergency-use filter Fe and the control amount setting portion 119 are immediately connected (S30), without executing the process from S16 to S22.

Figure 6:
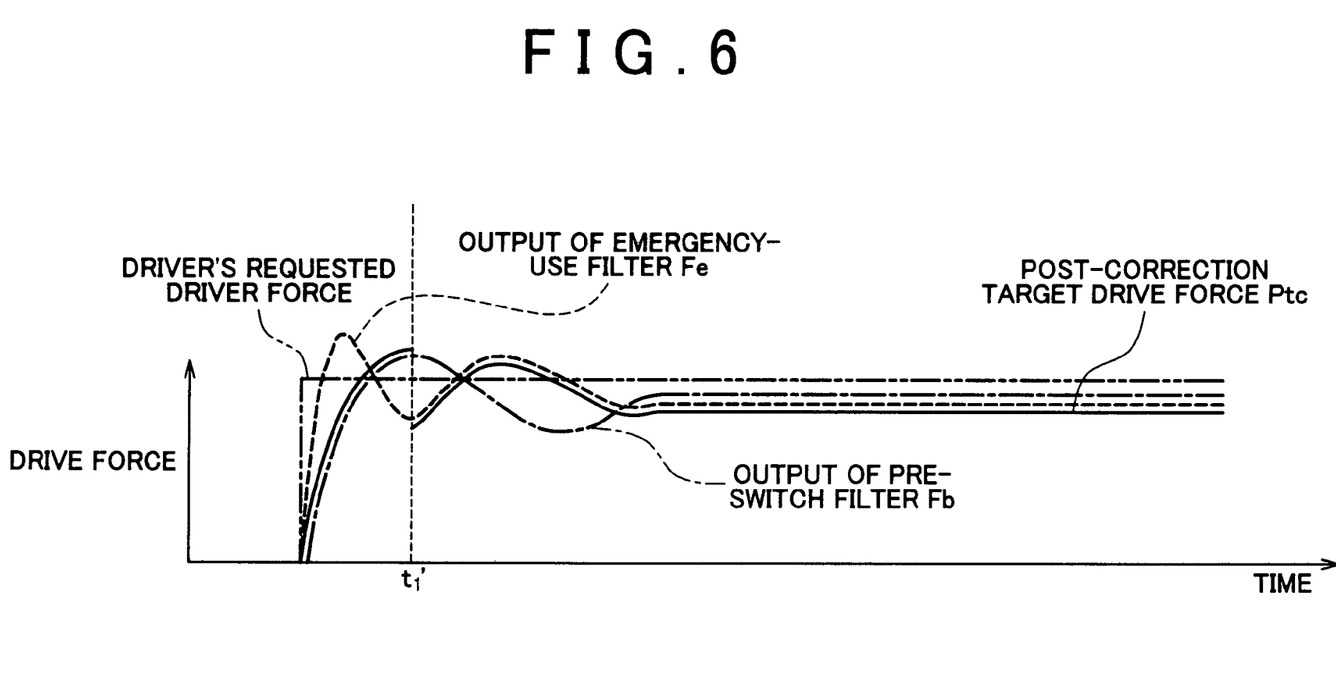
FIG. 6 is a time chart illustrating the states of corrected target drive force before and after filter switching.

That is, the filter setting portion 117 of the switcher 116 in this embodiment, if having determined that the degree of emergency is high, immediately switch the filter Fb having been used up to that time to the emergency-use filter Fe, without setting the waiting time tw that is set if the degree of emergency is low. It is to be noted that the term "immediately" used herein also covers the case where a certain buffer time exits. Therefore, supposing that it is determined that the degree of emergency is high at time point t1', the use of the emergency-use filter Fe for correction of the target drive force Pt begins approximately at time point t1' as indicated in FIG. 6. In this case, continuity between the output value of the pre-switch filter Fb and the output value of the post-switch filter Fa can basically not be secured, as indicated in FIG. 6. However, by promptly executing the filter switching at the time point when it is determined that the degree of emergency is high, it becomes possible to execute an appropriate vibration control correction of the target control amount corresponding to the case where the degree of emergency is high, through the use of the emergency-use filter Fe, and favorably secure safety during running of the vehicle.

Figure 5:
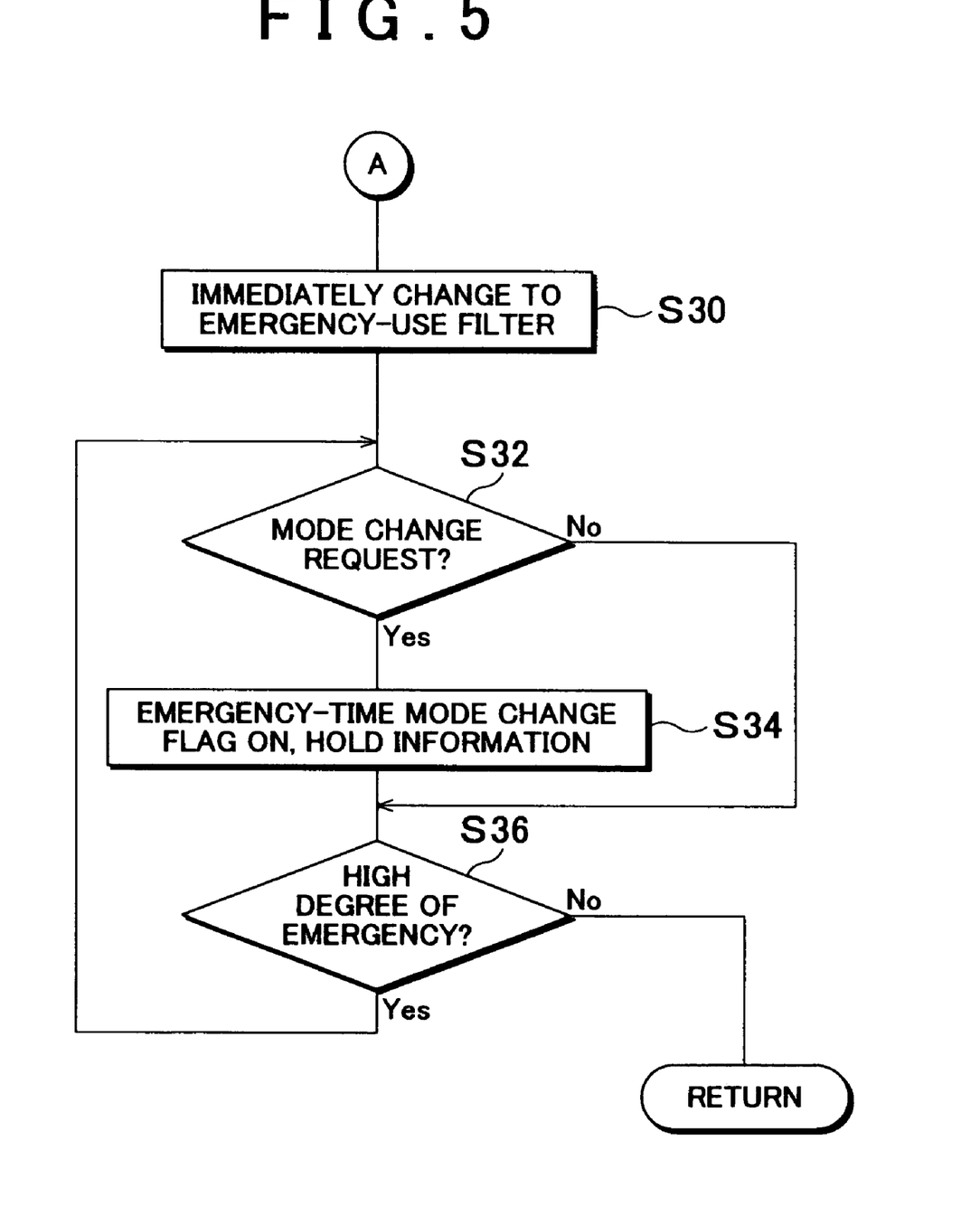
FIG. 5 is a flowchart illustrating a procedure of switching filters used for correction of the target drive force in the vehicle shown in FIG. 1.

As shown in FIG. 5, after switching the filter used for correction of the target drive force Pt to the emergency-use filter Fe, the filter setting portion 117 determines whether the mode switch 15 has been operated by the driver in order to change the running mode of the vehicle 1 (S32). In the vehicle 1 of this embodiment, if a request to change the running mode is made by a driver via the mode switch 15 while the degree of emergency is high, the running mode is not changed at that time. Specifically, if it is determined at S32 that the mode switch 15 has been operated by the driver (Yes at S32), the filter setting portion 117 turns on an emergency-time mode change flag indicating that the mode switch 15 has been operated by the driver while the degree of emergency is high, and stores information indicating the running mode intended by the driver, into a predetermined storage area (S34). Incidentally, if it is determined at S32 that the mode switch 15 has not been operated by the driver (NO at S32), the process of S34 is skipped.

After executing the process of S34, or if having making a negative determination at S32, the filter setting portion 117 determines that the degree of emergency is high (S36). If it is determined at S36 that the degree of emergency is high (YES at S36), the process from S32 to S36 is repeated. Thus, if it is determined that the degree of emergency is high, the emergency-use filter Fe continues to be used for vibration control correction of the target drive force Pt. Therefore, it becomes possible to execute appropriate vibration control correction of the target drive force Pt and therefore favorably secure safety during running of the vehicle. Conversely, if it is determined at S36 that the degree of emergency is low (NO at S36), the determination process of S10 is executed again.

In this manner, the process starting at S10 is repeatedly executed. If it is determined that the degree of emergency is low (YES at S10) and it is determined that the pitching resonance frequency as a vehicle specification has not changed (NO at S12), the filter setting portion 117 determines whether the emergency-time mode change flag is on (S26). If it is determined that the emergency-time mode change flag has not been turned on (NO at S26), the determination process of S10 is executed again.

Conversely, if it is determined that the emergency-time mode change flag has been turned on (YES at S26), the filter setting portion 117 reads information regarding the running mode intended by the driver from the predetermined storage area, and turns off the emergency-time mode change flag (S28). Then, using the information read from storage at S28, the filter setting portion 117 determines a new filter for correcting the target drive force Pt (S14). Therefore, if a running mode change request is made by a driver while the degree of emergency is high, it is possible to perform good vibration control of the vehicle 1 while the driver's intention is reflected.

Although the embodiment has been described on the assumption that as for each of the threshold value K and the threshold value N used for determining the waiting time tw, that is, the timing of switching filters, there is only one value, this is merely illustrative. That is, there may be a plurality of threshold values K to be compared with the deviation between the pre-switch and post-switch filter output values, and a plurality of threshold values N to be compared with the number of times of the deviation being less than or equal to a threshold value K. In this case, it may be advisable to select a threshold value K and a threshold value N corresponding to the running mode designated by the driver, and other factors, such as the running state and the environment of run of the vehicle 1, from the plurality of threshold values K and the plurality of threshold values N, and to determine a filter switching timing through the use of the threshold value K and the threshold value N selected.

The waiting time tw may be a constant value, which will allow simplification of the control involved in the filter switching. It is also possible to have a plurality of predetermined waiting times tw. In that case, a waiting time tw corresponding to the running mode designated by the driver, and other factors, such as the running state and the environment of run of the vehicle 1, may be selected from the plurality of waiting times tw, and the filter switching may be executed in accordance with the selected waiting time tw.

What is claimed is:

1. A vehicle control apparatus comprising:
    at least one target control amount setting device configured to set target control amount that is used in running of a vehicle based on at least a driver's request;
    a specification determining device configured to determine whether a vehicle specification that changes in accordance with the at least a driver's request has changed;
    a plurality of correcting devices including a first correcting device and a second correcting device that have damping characteristics different from each other, and that correct the target control amount set by the at least one target control amount setting device to control a vibration of a sprung weight of the vehicle; and
    a switching device configured to switch control from the first correcting device to the second correcting device, in response to a determination by the specification determining device that the vehicle specification has changed,
    wherein the target control amount is a target drive force of the vehicle, the first correction device includes a first two-dimensional notch filter and the second correction device includes a second two-dimensional notch filter, and the first and second two-dimensional notch filters have individually different parameters for determining damping characteristics,
    wherein each of the first and second two-dimensional notch filters is configured so that a component that induces oscillation is controlled in a transfer function where an input is the target drive force and an output is a suspension stroke of the vehicle, and
    wherein a difference determining device configured to make a determination when a difference between an output value of the first correcting device and an output value of the second correcting device converges at or below a predetermined value, and wherein the switching device is additionally and add configured to respond to the determination when the difference is at or below the predetermined value such that the determination when the difference is at or below the predetermined value is additionally required before the switching device switches control from the first correcting device to the second correcting device.

2. The vehicle control apparatus according to claim 1, wherein a timing device makes a determination that a waiting time has elapsed after the determination that the vehicle specification has changed, and wherein the switching device switches control from the first correcting device to the second correcting device in response to both: (1) the determination by the specification determining device that the vehicle specification has changed, and (2) the determination by the timing device that the waiting time has elapsed after the determination by the specification determining device that the vehicle specification has changed.

3. The vehicle control apparatus according to claim 2, wherein the timing device commences timing of the waiting time in response to a determination by a difference determining device which makes a determination of when a difference between an output value of the first correcting device and an output value of the second correcting device is at or below a predetermined value after the determination that the vehicle specification has changed, such that control is switched from the first correcting device to the second correcting device in response to the timing device determining the waiting time has elapsed after the determination by the difference determining device.

4. The vehicle control apparatus according to claim 1, wherein a difference determining device makes a determination when an absolute value of a difference between an output value of the first correcting device and an output value of the second correcting device converges at or below a first threshold value after the specification determining device determines the vehicle specification has changed; and
wherein the switching device switches control from the first correcting device to the second correcting device in response to both: (1) the determination by the specification determining device that the vehicle specification has changed, and (2) the determination by the difference determining device that the absolute value of the difference is at or below the first threshold value after the specification determining device determines the vehicle specification has changed.

5. The vehicle control apparatus according to claim 4, wherein a timing device increments a count value in response to the difference determining device determining the absolute value of the difference is less than or equal to the first threshold value, and wherein the switching device additionally responds to a determination by the timing device that the count value is greater than a second threshold value, such that the count value being greater than the second threshold value is additionally required before the switching device switches the control from the first correcting device to the second correcting device.

6. The vehicle control apparatus according to claim 5, wherein the switching device changes the first threshold value and the second threshold value in response to at least a driver's request.

7. The vehicle control apparatus according to claim 1, further comprising:
an emergency determining device that determines a degree of emergency based on at least a running state of the vehicle; and
a third correcting device which corrects the target control amount based on the degree of emergency determined by the emergency determining device.

8. The vehicle control apparatus according to claim 7, wherein the switching device promptly switches the control from the first correcting device to the third correcting device based on the degree of emergency.

9. The vehicle control apparatus according to claim 7, wherein the emergency determining device determines that the degree of emergency is high in response to a determination that at least one of following conditions is met:
(1) a condition that an emergency brake request has been made;
(2) a condition that a behavior stabilization request has been made;
(3) a condition that a brake assist request or a crash prevention request has been made;
(4) a condition that a possibility of occurrence of an emergency, including a crash, has been detected; and
(5) a condition that a fail signal has been generated.

10. The vehicle control apparatus according to claim 9, wherein in response to a determination by the at least one target control amount setting device that the behavior stabilization request and the crash prevention request are simultaneously output, the at least one target control amount setting device gives priority to the crash prevention request, and the switching device switches the control to the third correcting device corresponding to the crash prevention request.

11. The vehicle control apparatus according to claim 7, wherein the third correcting device is a two-dimensional notch filter, and the first correcting device, the second correcting device and the third correcting device have individually different parameters for damping characteristics of each other.

* * * * *